United States Patent [19]
Wood

[11] 4,061,206
[45] Dec. 6, 1977

[54] BICYCLE BRAKE

[75] Inventor: William H. Wood, Reseda, Calif.

[73] Assignee: Airheart Products, Inc., Chatsworth, Calif.

[21] Appl. No.: 754,426

[22] Filed: Dec. 27, 1976

[51] Int. Cl.² .............................................. B62L 3/02
[52] U.S. Cl. ..................................... 188/26; 188/72.7
[58] Field of Search ......................... 188/26, 72.6–72.9

[56] References Cited
U.S. PATENT DOCUMENTS

| | | | |
|---|---|---|---|
| 3,651,897 | 3/1972 | Hahn | 188/72.7 X |
| 3,894,618 | 7/1975 | Enright | 188/26 X |
| 3,989,124 | 11/1976 | Fujii | 188/72.7 X |

*Primary Examiner*—Duane A. Reger
*Attorney, Agent, or Firm*—William W. Haefliger

[57] ABSTRACT

A brake for a motorcycle or bicycle, of the type having a frame and a disc rotatable with a wheel, comprises:

a. a housing having a fork defining a slot to receive a wheel axle bolt, and a connection to the frame, the housing configured to embrace a portion of the disc, b. brake pad means located within the housing to laterally engage the disc, c. a carrier and first ramp means on the carrier and supporting the brake pad means, the carrier being longitudinally movable and laterally resiliently flexible, within the housing, d. second ramp means on the housing and presented generally toward the first ramp means, and e. roller means located between the first and second ramp means to rollably urge the first ramp means and brake pad means laterally toward the disc, with accompanying resilient flexing of the carrier, in response to bodily movement of the carrier and first ramp means in one longitudinal direction.

11 Claims, 5 Drawing Figures

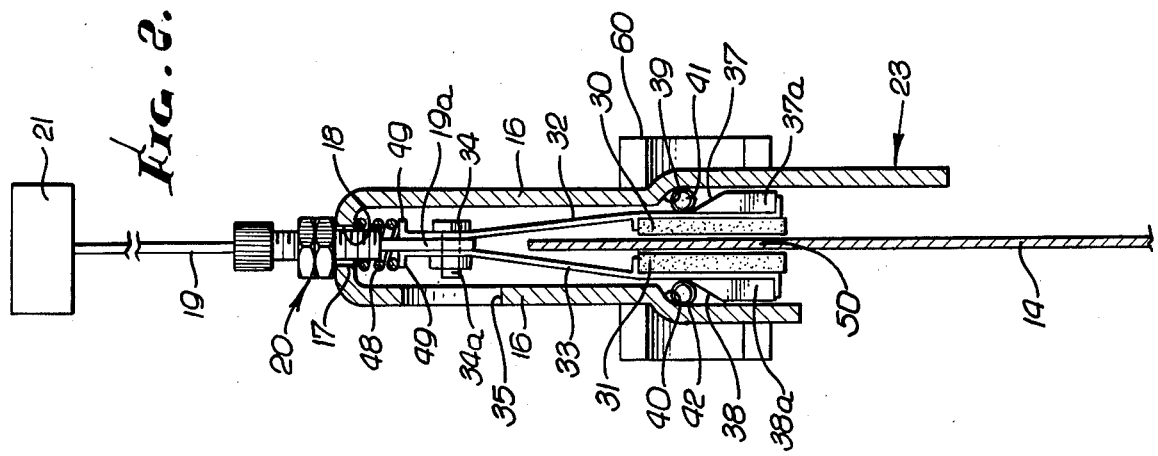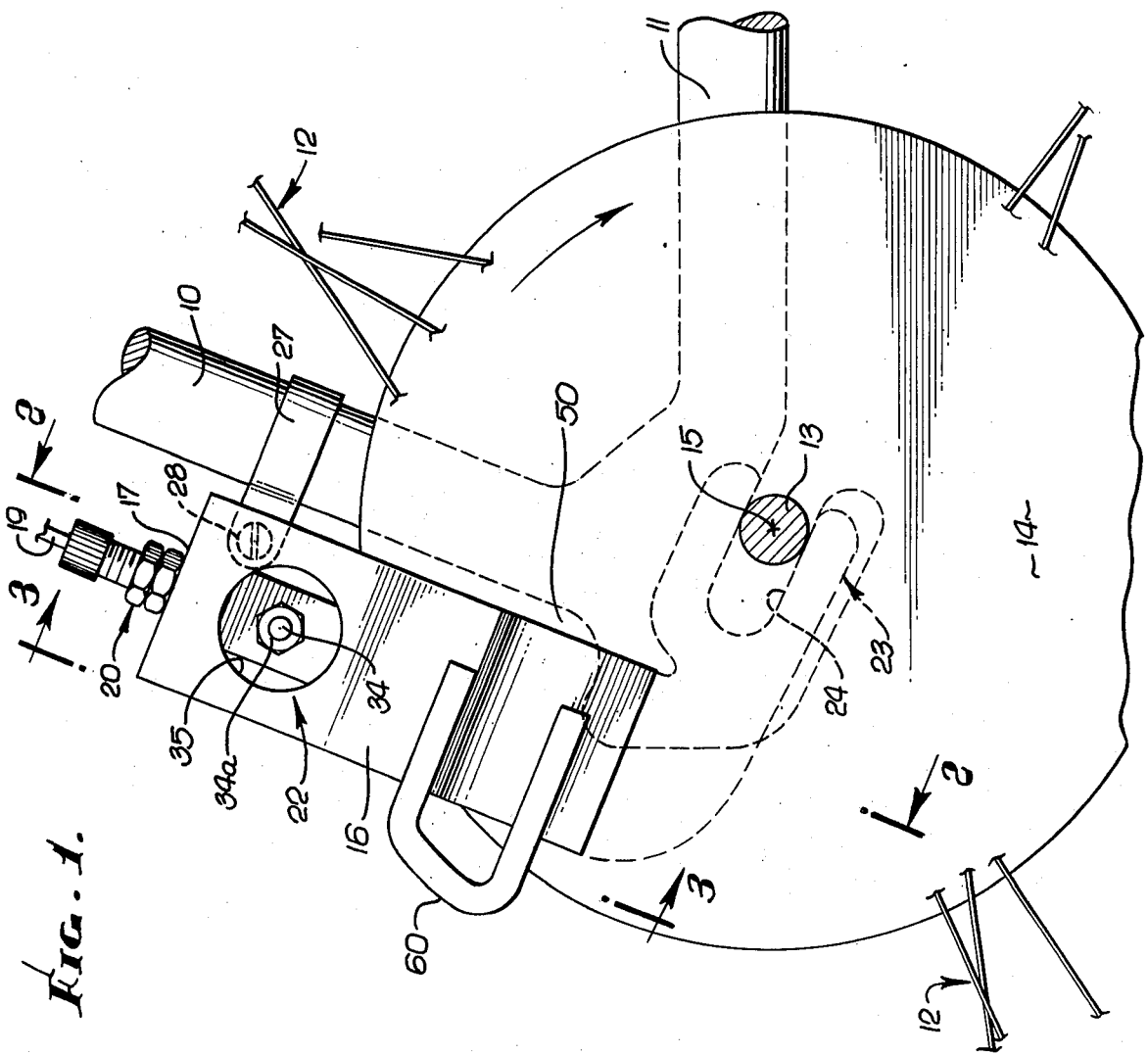

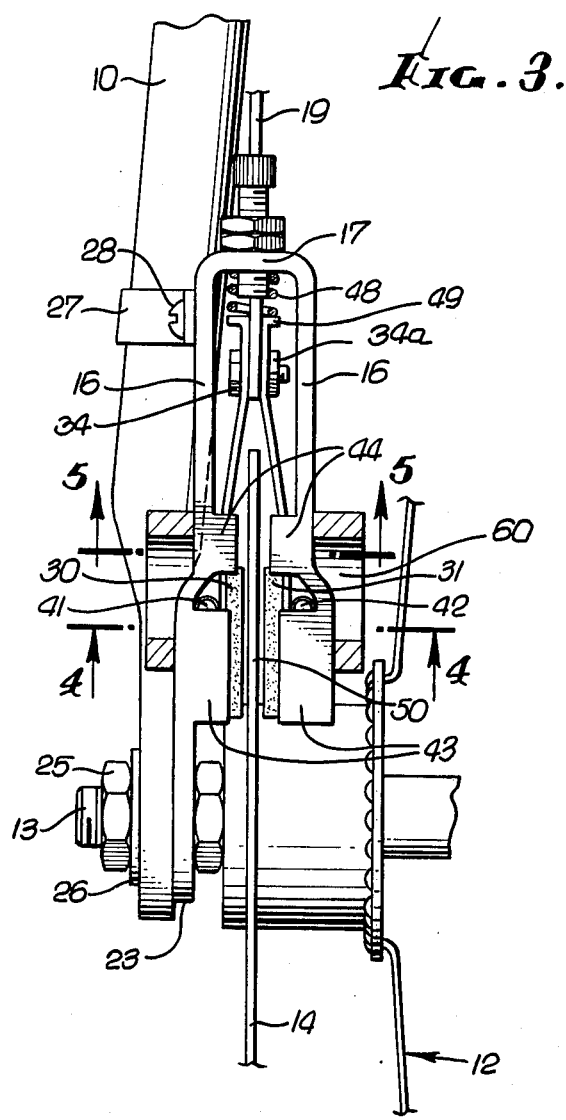
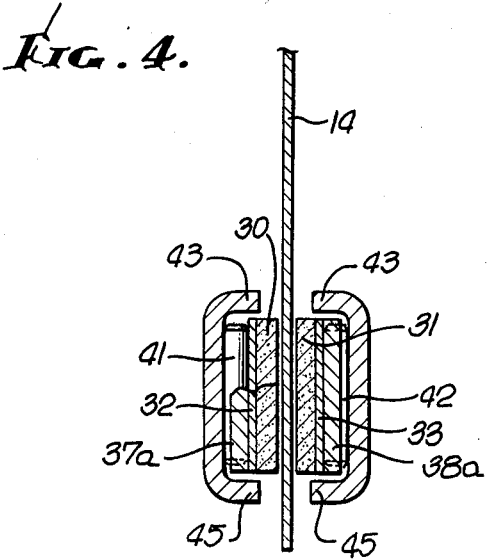
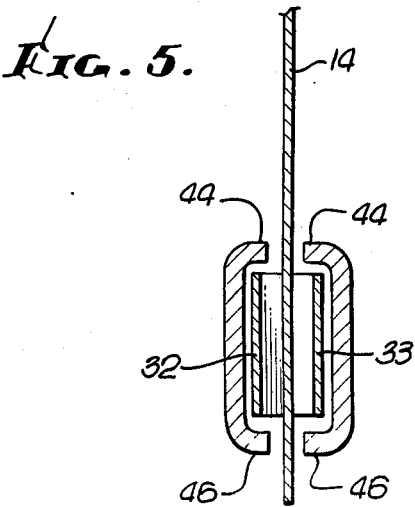

4,061,206

BICYCLE BRAKE

BACKGROUND OF THE INVENTION

This invention relates generally to bicycle and motorcycle brakes, and more particularly concerns a simple brake that is easily attachable to a bicycle or motorcycle frame and wheel bolt.

There is a constant need for highly reliable, simple, inexpensive and effective disc brakes for bicycles and motorcycles. While many brake structures have been proposed, none to my knowledge incorporate the unusual features of construction, mode of operation and results as are now afforded by the present invention, as will appear. These include, adaptation to many different bicycle frame arrangements; extreme simplicity of construction and operation; and adjustability to compensate for brake pad wear.

SUMMARY OF THE INVENTION

Basically, the brake is for a bicycle or motorcycle having a frame and a disc rotatable with a wheel, and includes:

a. a housing having a fork defining a slot to receive a wheel axle bolt, and a connection to the frame, the housing configured to embrace a portion of the disc, b. brake pad means located within the housing to laterally engage the disc, c. a carrier and first ramp means on the carrier and supporting the brake pad means, the carrier being longitudinally movable and laterally resiliently flexible, within the housing, d. second ramp means on the housing and presented generally toward the first ramp means, and e. roller means located between the first and second ramp means to rollably urge the first ramp means and brake pad means laterally toward the disc, with accompanying resilient flexing of the carrier, in response to bodily movement of the carrier and first ramp means in one longitudinal direction.

Further, the housing may include a U-shaped strap having a cross-piece through which an actuating cable extends to adjustably connect to the pad carrier in the form of two laterally resiliently flexible legs; the brake is located over a portion of the disc that rotates in a direction to make the brake self-energizing; and the fork which transfers brake load to the wheel axle bolt also pivots about the bolt to allow connection of the housing strap to a wide range of bicycle frame member angularities.

These and other objects and advantages of the invention, as well as the details of an illustrative embodiment, will be more fully understood from the following description and drawings in which:

DRAWING DESCRIPTION

FIG. 1 is a side elevation;

FIG. 2 is a vertical section on lines 2—2 of FIG. 1;

FIG. 3 is a side elevation of the brake housing bracket;

FIG. 4 is a horizontal section on lines 4—4 of FIG. 3; and

FIG. 5 is a horizontal section on lines 5-5 of FIG. 3.

DETAILED DESCRIPTION

In the drawings, a bicycle or motorcycle has a tubular frame including members 10 and 11 proximate a wheel, designated for example by spokes 12. The wheel includes an axle bolt projecting at 13. Mounted on the wheel or bolt 13 is a thin brake disc 14, the disc being rotatable with the wheel about axis 15.

In accordance with the invention, a housing 22 is provided, and may advantageously take the form of a metallic strap which is U-shaped and incorporates two laterally spaced arms 16 and a cross-over connection 17. The latter forms a suitable opening at 18 to pass a brake actuating cable 19, as well as a fitting 20 for the cable, the fitting mounted to the connection 17. A brake lever on the bicycle or motorcycle handle is schematically shown at 21. The arms 16 embrace disc 14.

A fork 23 projects from and is integral with one of the housing arms 16, the fork defining a slot 24 to receive the wheel axle bolt. A nut 25 and washer 26 on the bolt serve to clamp the fork to the frame. Another housing connection to the frame is afforded by the clamp 27, the latter being attached to the housing at 28 at the end thereof remote from the fork.

Further in accordance with the invention, brake pad means is located within the housing to laterally engage the disc 14; a carrier is provided along with first ramp means on the carrier and supporting the brake pad means, the carrier being longitudinally movable and laterally resiliently flexible within the housing; and second ramp means is provided on the housing and presented generally toward the first ramp means; and roller means is located between the first and second ramp means to rollably and clampingly urge the first ramp means and brake pad means laterally toward the disc, in response to bodily movement of the carrier and first ramp means in one longitudinal direction (as for example upwardly).

More specifically, the brake pad means may include two laterally spaced brake pads 30 and 31 located to engage opposite sides of the disc; and the carrier may include two laterally spaced, longitudinally extending legs 32 and 33 respectively carrying the pads, within the housing. The legs are formed of thin metal strips, which are laterally resiliently flexible. They are joined as by a connecting fastener 34 at a location between the cross-over 17 and the pads. That fastener connection is accessible through a side opening 35 in one strap arm 16, whereby a fastener nut 34a may be accessed. The end portion 19a of the cable 19 is clamp-attached by the fastener to the legs 16, and loosening of the accessed nut allows longitudinal adjustment of the cable to compensate for brake pad wear.

The first ramp means includes, as shown, two laterally spaced first ramps 37 and 38 respectively attached to the two legs, at the outer sides thereof, with clearance between the ramp bodies 37a and 38a and the arms 16. The ramps taper in one longitudinal direction, i.e. upwardly as shown. The second ramp means includes two laterally spaced second tramps 39 and 40 on the housing arms 16, and also tapering upwardly. Two rollers are provided, one at 41 between one first ramp 37 and one second ramp 39, and another roller 42 located between another first ramp 38 and another second ramp 40. Accordingly, as the cable is pulled upwardly, the rollers 41 and 42 urge the upwardly displaced ramps 37 and 38 laterally inwardly, with legs 32 and 33 appropriately flexing, and the pads grip and brake the disc. Stop means provided by in-turned flanges 43 and 44 on the arms limit travel of the legs and pads in one direction of disc rotation, and in-turned flanges 45 and 46 on the arms limit travel of the legs and pads in the opposite direction of disc rotation.

A return spring 48 in the housing extends about the cable 19 and is shouldered between the cross-piece 17 and flanges 49 on the legs 32 and 33 for yieldably urging the carrier in the return direction, i.e. downward, following a brake application. Note that the brake is located, in FIG. 1, so that the disc has a zone 50 between and adjacent the pads, that zone rotatable generally in the longitudinally upward direction in response to bicycle forward movement, so that the brake, when applied, is self-energizing. Fork 23 holds the brake against up-movement with the disc. The fork also pivots about the wheel bolt, prior to clamping, to allow accommodation of the brake housing to differently angled frames 10.

Note reinforcement U-shaped member 60 integral with legs 16 to hold them in fixed spaced relation.

I claim:

1. In a brake for a motorcycle or bicycle having a frame and a disc rotatable with a wheel, the combination comprising
   a. a housing having a fork defining a slot to receive a wheel axle bolt, and a connection to the frame, the housing configured to embrace a portion of the disc,
   b. brake pad means located within the housing to laterally engage the disc,
   c. a carrier and first ramp means on the carrier and supporting the brake pad means, the carrier being longitudinally movable and laterally resiliently flexible, within the housing,
   d. second ramp means on the housing and presented generally toward the first ramp means, and
   e. roller means located between the first and second ramp means to rollably urge the first ramp means and brake pad means laterally toward the disc, with accompanying resilient flexing of the carrier, in response to bodily movement of the carrier and first ramp means in one longitudinal direction,
   f. there being a cable having a connection with the carrier and extending from the housing to be pulled for bodily moving the carrier and first ramp means in said longitudinal direction,
   g. said housing comprising a U-shaped strap means having two arms and a cross-over connection, said arms extending in said longitudinal direction, said cross-over connection forming an opening to pass said cable,
   h. the cable connection, brake pad means, carrier, first and second ramp means and roller means being protectively confined between said two arms of said U-shaped strap means.

2. The combination of claim 1 including said bicycle incorporating said frame, disc wheel and wheel axle bolt, said fork clamped to said bolt and said housing clamped to said frame.

3. The combination of claim 1 including a return spring in the housing yieldably urging said carrier in the opposite longitudinal direction.

4. The combination of claim 2 wherein said disc has a zone directly adjacent the pad and rotatable generally in said longitudinal direction in response to bicycle forward movement.

5. The combination of claim 1 wherein said brake pad means includes two laterally spaced brake pads to engage opposite sides of the disc.

6. The combination of claim 5 wherein said carrier includes two laterally spaced legs respectively carrying said pads, said legs being laterally resiliently flexible.

7. The combination of claim 6 wherein said first ramp means includes two laterally spaced first ramps respectively on the two legs, the ramps tapering in said one longitudinal direction.

8. The combination of claim 7 wherein said second ramp means includes two laterally spaced second ramps on the housing and tapering in said one direction, said roller means including two rollers, one roller located between one first ramp and one second ramp, and the other roller located between the other first ramp and the other second ramp.

9. The combination of claim 7 including stop means in the form of in-turned flanges on the strap arms to limit travel of said legs and pads in the direction of disc rotation in response to gripping of the disc by said pads.

10. The combination of claim 8, wherein said fork is carried by and projects from one of said arms.

11. In a brake for a motorcycle or bicycle having a frame and a disc rotatable with a wheel, the combination comprising
   a. a housing having a fork defining a slot to receive a wheel axle bolt, and a connection to the frame, the housing configured to embrace a portion of the disc,
   b. brake pad means located within the housing to laterally engage the disc,
   c. a carrier and first ramp means on the carrier and supporting the brake pad means, the carrier being longitudinally movable and laterally resiliently flexible, within the housing,
   d. second ramp means on the housing and presented generally toward the first ramp means, and
   e. roller means located between the first and second ramp means to rollably urge the first ramp means and brake pad means laterally toward the disc, with accompanying resilient flexing of the carrier, in response to bodily movement of the carrier and first ramp means in one longitudinal direction,
   f. said brake pad means including two laterally spaced brake pads to engage opposite sides of the disc, said carrier including two laterally spaced legs respectively carrying said pads, said legs being laterally resiliently flexible, said first ramp means including two laterally spaced first ramps respectively on the two legs, the ramps tapering in said one longitudinal direction, said second ramp means including two laterally spaced second ramps on the housing and tapering in said one direction, said roller means including two rollers, one roller located between one first ramp and one second ramp, and the other roller located between the other first ramp and the other second ramp,
   g. said housing comprising a U-shaped strap having two arms and a cross-over connection, said arms extending in said longitudinal direction, said fork carried by and projecting from one of said arms, and said cross-over connection forming an opening to pass a cable connected with said legs,
   h. one of said arms forming a side opening, and including a connection joining said legs at a location between said cross-over connection and said ramps and pads, said connection being accessible through said side opening to allow adjustment of an actuating cable clamp-attached by the fastener to said legs.

* * * * *